(12) United States Patent
Shin et al.

(10) Patent No.: US 9,479,839 B2
(45) Date of Patent: Oct. 25, 2016

(54) METHOD AND SYSTEM FOR PROVIDING A REPRESENTATIVE PHRASE BASED ON KEYWORD SEARCHES

(75) Inventors: Jae Seung Shin, Seongnam-si (KR); Young Sub Park, Seongnam-si (KR); Jae Keol Choi, Seongnam-si (KR); Won Sook Noh, Seoul (KR)

(73) Assignee: NHN Corporation, Seongnam-si (KR)

( * ) Notice: Subject to any disclaimer, the term of this patent is extended or adjusted under 35 U.S.C. 154(b) by 181 days.

(21) Appl. No.: 13/177,149

(22) Filed: Jul. 6, 2011

(65) Prior Publication Data

US 2012/0010874 A1 Jan. 12, 2012

(30) Foreign Application Priority Data

Jul. 6, 2010 (KR) ........................ 10-2010-0064978

(51) Int. Cl.
*G06F 17/27* (2006.01)
*G06F 17/30* (2006.01)
*G06F 13/00* (2006.01)
*H04N 7/173* (2011.01)
*H04N 21/475* (2011.01)
*H04N 21/482* (2011.01)
*H04N 21/8405* (2011.01)

(52) U.S. Cl.
CPC ...... *H04N 21/4828* (2013.01); *H04N 21/8405* (2013.01)

(58) Field of Classification Search
CPC ........ G06F 17/27; G06F 17/30; G06F 13/00; H04N 21/475; H04N 7/1443
USPC .................. 704/1–9; 707/2, 5, 10; 358/1.16; 725/14, 40, 45, 53, 46, 47
See application file for complete search history.

(56) References Cited

U.S. PATENT DOCUMENTS

| 8,073,851 B2 * | 12/2011 | Takata ............... G06F 17/30657 707/739 |
| 8,132,118 B2 * | 3/2012 | Danker ................ G06F 3/0236 707/759 |
| 8,140,562 B1 * | 3/2012 | Kuraoka ........... G06F 17/30643 707/767 |
| 8,280,878 B2 * | 10/2012 | Warnock ........... G06F 17/30696 707/723 |
| 2004/0025180 A1 * | 2/2004 | Begeja .............. G06F 17/30017 725/46 |

(Continued)

FOREIGN PATENT DOCUMENTS

| JP | 2002-320159 | 10/2002 |
| JP | 2004-355483 | 12/2004 |

(Continued)

OTHER PUBLICATIONS

Non-Final Office Action issued on Mar. 28, 2013 in association with U.S. Appl. No. 13/176,375.

(Continued)

*Primary Examiner* — Pierre-Louis Desir
*Assistant Examiner* — Seong Ah A Shin
(74) *Attorney, Agent, or Firm* — Harness, Dickey & Pierce, P.L.C.

(57) ABSTRACT

Provided is a method and system for providing a representative phrase with respect to a real time popular keyword, which may determine programs including a popular keyword from broadcast information, and may generate a representative phrase with respect to the popular keyword using the determined programs, thereby providing the representative phrase by combining the generated representative phrase and the popular keyword.

19 Claims, 7 Drawing Sheets

(56) References Cited

U.S. PATENT DOCUMENTS

| | | | |
|---|---|---|---|
| 2005/0289599 A1* | 12/2005 | Matsuura | G11B 27/034 725/53 |
| 2006/0224496 A1* | 10/2006 | Sandholm | G06Q 30/02 705/37 |
| 2006/0282856 A1* | 12/2006 | Errico | G06F 17/30035 725/46 |
| 2008/0271080 A1* | 10/2008 | Gossweiler | G06F 3/0486 725/47 |
| 2008/0285081 A1* | 11/2008 | Watanabe | G06F 17/30011 358/1.16 |
| 2009/0292677 A1* | 11/2009 | Kim | G06F 17/3089 |
| 2009/0299998 A1* | 12/2009 | Kim | G06F 17/30864 |
| 2010/0031294 A1* | 2/2010 | Takagi | H04N 5/44543 725/45 |
| 2010/0162164 A1* | 6/2010 | Kwon | G06F 17/30864 715/803 |
| 2010/0299692 A1* | 11/2010 | Rao | G06F 17/30696 725/14 |
| 2011/0004462 A1* | 1/2011 | Houghton | G10L 15/183 704/9 |
| 2011/0218864 A1* | 9/2011 | Pentz | G06Q 30/0241 705/14.71 |
| 2012/0010874 A1 | 1/2012 | Shin et al. | |
| 2012/0036153 A1* | 2/2012 | Lee | G06F 17/30026 707/770 |
| 2012/0054795 A1* | 3/2012 | Kang | G06F 17/3066 725/40 |
| 2012/0166438 A1* | 6/2012 | Wu | G06F 17/3064 707/737 |
| 2012/0254917 A1* | 10/2012 | Burkitt | G06F 17/30817 725/40 |
| 2013/0074109 A1* | 3/2013 | Skelton | H04H 20/00 725/14 |
| 2014/0214883 A1* | 7/2014 | Sanderson | G06F 17/30424 707/769 |

FOREIGN PATENT DOCUMENTS

| | | |
|---|---|---|
| JP | 2006-139718 | 6/2006 |
| JP | 4462014 | 6/2006 |
| JP | 2007-241568 | 9/2007 |
| JP | 2009-003888 | 1/2009 |
| JP | 4342575 | 1/2009 |
| JP | 2009-134700 | 6/2009 |
| JP | 2010-009742 A | 1/2010 |
| JP | 2010-028586 A | 2/2010 |
| KR | 10-2004-0029895 | 4/2004 |
| KR | 10-2007-0051227 | 5/2007 |
| KR | 10-2007-0067058 | 6/2007 |

OTHER PUBLICATIONS

Japanese Office Action dated Nov. 4, 2014 in corresponding Japanese Application No. 2011-144939.
U.S. Appl. No. 13/176,375, filed Jul. 5, 2011.

* cited by examiner

METHOD AND SYSTEM FOR PROVIDING A REPRESENTATIVE PHRASE BASED ON KEYWORD SEARCHES

CROSS-REFERENCE TO RELATED APPLICATION

This application claims priority from and the benefit of Korean Patent Application No. 10-2010-0064978, filed on Jul. 6, 2010, which is hereby incorporated by reference for all purposes as if fully set forth herein.

BACKGROUND OF THE INVENTION

1. Field of the Invention

Exemplary embodiments of the present invention relates to a method and system for generating a representative phrase based on keyword searches, and more particularly, to keywords used as search terms for an online application.

2. Discussion of the Background

A popular keyword, that is, a keyword used in a search engine numerous times at an increasing rate in real time over a brief period of time, may be extracted from a source, such as a web page that has keyword searching capabilities. Thus, a keyword identified as "popular" may be displayed or identified on the source, such as a content providing page (i.e a web page or the like). Further, the web page may display how popular the keyword is, and display the keywords searched for in an order of more popular to less popular.

Multiple users may perform a search for specific information at a certain time. For example, common keywords may be used if the users desire to know cast information while watching a television (TV) show or listening to the radio, or if the user desires to know what time a particular program is scheduled to start, or if the users desire to know about the content of a particular program to be broadcast today. Thus, a keyword search commonly used by users may correspond to a name of a celebrity or a title of a program.

Thus, a method is needed that may provide a program corresponding to a real time popular keyword, thereby indicating to users a reason a word may be a real time popular keyword.

The above information disclosed in this Background section is only for enhancement of understanding of the background of the invention and therefore it may contain information that does not form any part of the prior art.

SUMMARY

Exemplary embodiments of the present invention provide a method and system for generating a representative phrase that may indicate a reason why a popular keyword may be searched, using broadcast information.

Exemplary embodiments of the present invention also provide a method and system for combining a representative phrase generated based on broadcast information, and a popular keyword, and displaying the representative phrase.

Additional features of the invention will be set forth in the description which follows, and in part will be apparent from the description, or may be learned by practice of the invention.

An exemplary embodiment of the present invention discloses a method of providing a representative phrase, including obtaining broadcast information. Then, obtaining a popular keyword from a content providing page. Generating a representative phrase associated with the broadcast information and the popular keyword and providing the representative phrase.

An exemplary embodiment of the present invent also discloses system for providing a representative phrase, the system including a representative phrase generator to generate a representative phrase associated with broadcast information and a popular keyword from a content providing page; and a representative phrase provider to provide the representative phrase.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
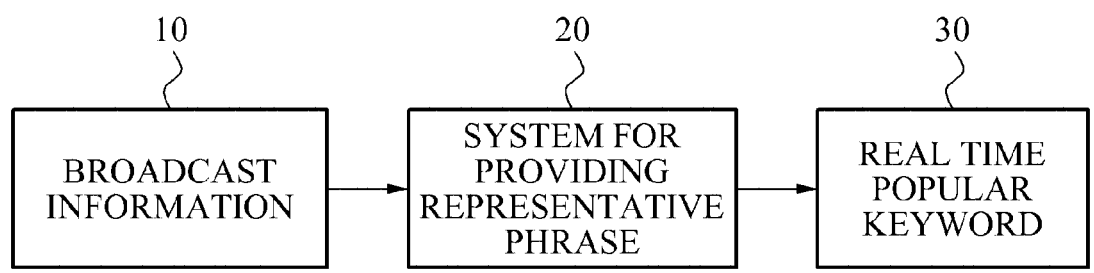
FIG. 1 is a diagram provided to describe a process of generating a representative phrase according to an exemplary embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Furthermore, like reference numerals in the drawings denote like elements.

FIG. 1 is a diagram provided to describe a process of generating a representative phrase according to an exemplary embodiment of the present invention.

According to FIG. 1, a system 20 for providing a representative phrase, may obtain broadcast information 10 associated with a popular keyword 30. For example, the system for providing a representative phrase 20 may periodically collect the broadcast information from a broadcasting station at predetermined times. The broadcasting station may correspond to various sources, including, but not limited to: public TV broadcasters, cable TV broadcasters, radio broadcasters, Internet broadcasters, and satellite TV broadcasters.

The system for providing a representative phrase 20 may determine a correlation between programs from the obtained broadcast information with the popular keywords. The system for providing a representative phrase 20 may generate a representative phrase based on the above correlation. The representative phrase may be directed to a reason or cause for the popular keyword appearing at a certain time.

For example, the system for providing a representative phrase 20 may generate the representative phrase as the airtime of the determined programs. Here, the airtime may include a broadcast start time and a broadcast end time of a program.

After which, the system for providing a representative phrase 20 may display the representative phrase by combining the generated representative phrase along with the popular keyword.

Figure 2:
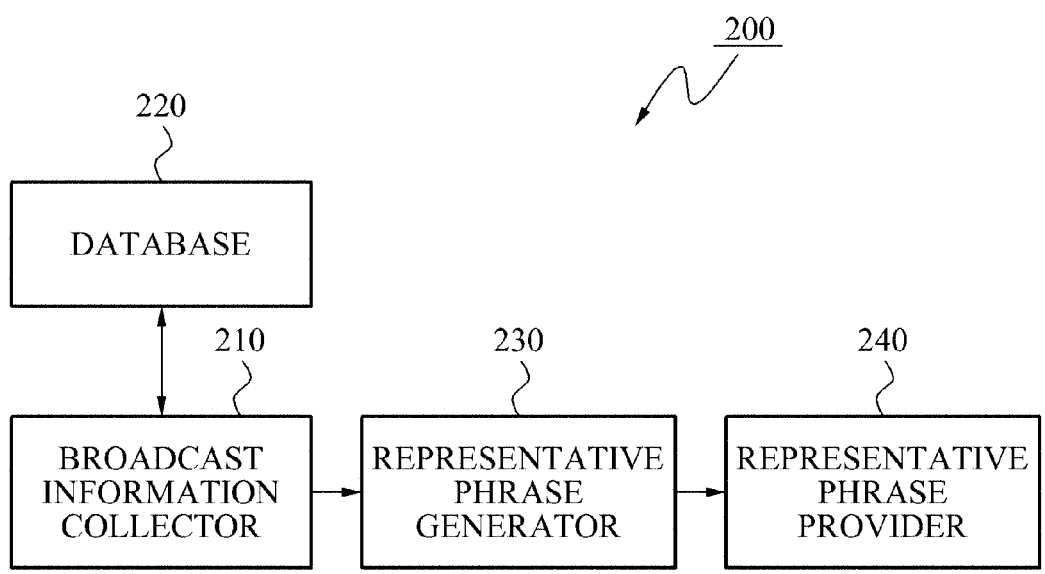
FIG. 2 is a diagram illustrating a configuration of a system for providing a representative phrase according to an exemplary embodiment of the present invention.

FIG. 2 is a diagram illustrating a configuration of a system 200 for providing a representative phrase according to an exemplary embodiment of the present invention.

Referring to FIG. 2, the system for providing a representative phrase 200 may include a broadcast information collector 210, a database 220, a representative phrase generator 230, and a representative phrase provider 240.

The broadcast information collector 210 may obtain broadcast information from a broadcasting station. The broadcasting station may be public TV broadcasters, cable TV broadcasters, radio broadcasters, Internet broadcasters, satellite TV broadcasters, or the like. The broadcast information collector 210 may periodically obtain the broadcast information at predetermined times. Examples of predetermined times include every morning, every noon, every afternoon, every Thursday, and the like.

The broadcast information collector 210 may store the obtained broadcast information in the database 220 in a table such as Table 1 shown below.

ference value as an absolute value of a difference between the current time and the broadcast start time.

As another example, if the current time associated with the popular keyword is after the broadcast end time, the representative phrase generator 230 may calculate the difference value as an absolute value of a difference between the current time and the broadcast end time.

As another example, if the current time associated with the popular keyword occurs between the broadcast start time and the broadcast end time, the representative phrase generator 230 may calculate the difference value as an absolute value of a difference between either the broadcast start time or the broadcast end time, and the current time. For example, a base value of when the broadcast information collector 210 starts correlating popular keywords with broadcast information may be a predetermined value. Two hours may be used as the predetermined value, based on a high volume of searches being performed two hours before a broadcast start time and two hours after the broadcast end time. However, any number or value desired by a user may be used.

The representative phrase generator 230 may generate a representative phrase associated with the popular keyword by comparing the calculated difference value and the predetermined base value. For example, if the calculated difference value is lower than the predetermined base value, the representative phrase generator 230 may generate the representative phrase based on the airtime of the determined program.

Figure 3:
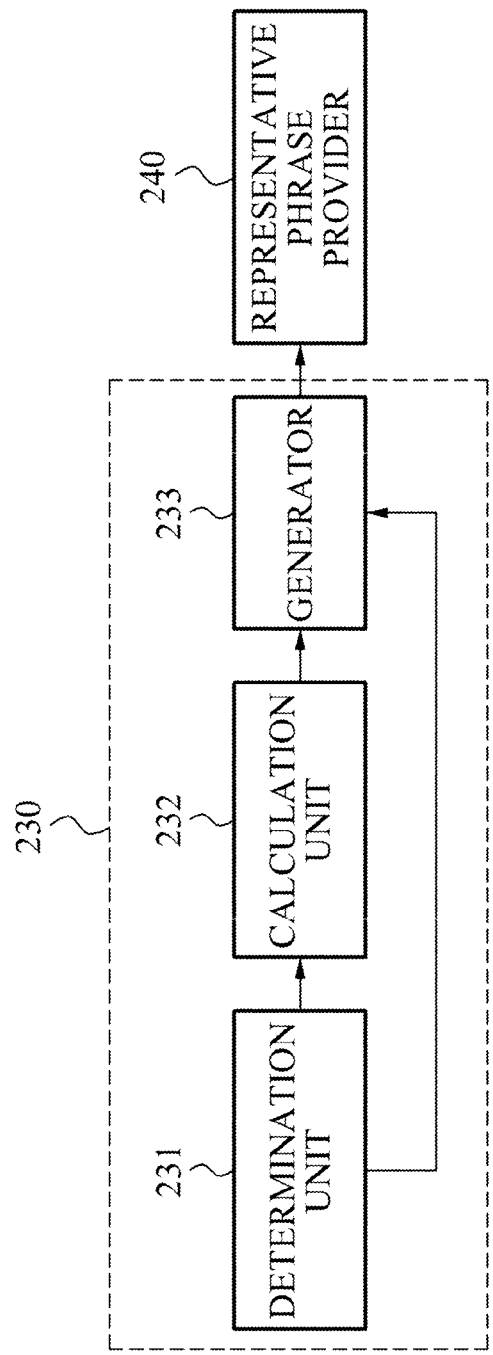
FIG. 3 is a diagram illustrating a configuration of a representative phrase generator according to an exemplary embodiment of the present invention.

FIG. 3 is a diagram illustrating a configuration of the representative phrase generator 230 according to an exemplary embodiment of the present invention.

According to FIG. 3, the representative phrase generator 230 may include a determination unit 231, a calculation unit 232, and a generator 233.

The determination unit 231 may determine programs from the broadcast information associated with a popular keyword, by determining a correlation between the popular keyword to the broadcast information.

As an example, if "XXX" is a popular keyword from a source of keywords, such as a content providing page, the determination unit 231 may determine a program based on

TABLE 1

| Broadcasting Station | Program title | Start time | End time | Cast | Character name | Contents |
| --- | --- | --- | --- | --- | --- | --- |
| AAA | AAA News | 20100312 8.00 p.m. | 20100312 9.00 p.m. | KKK | | Election, Voting |
| BBB2 | XXX | 20100312 10.00 p.m. | 20100312 11.20 p.m. | OOO, PPP | QQQ, RRR | Slave, Run, General |
| BBB1 | YYY | 20100312 10.00 p.m. | 20100312 11.00 p.m. | JJJ | | Glasses, Secret |
| BBB2 | ZZZ | 20100312 9.00 p.m. | 20100312 10.00 p.m. | VVV, PPP | | Rice Planting, Becoming a farmer |

The representative phrase generator 230 may determine programs from the broadcast information based on the popular keyword or popular keywords. The representative phrase generator 230 may calculate a difference value as an absolute value of a difference between a current time of associated with the popular keyword and an airtime of a determined program. The airtime may include a broadcast start time and a broadcast end time.

As an example, if the current time associated with the popular keyword is before the broadcast start time, the representative phrase generator 230 may calculate the difthe popular keyword "XXX", by correlating the popular keyword to various categories contained in the broadcast information of Table 1.

For example, if a current time occurs before a broadcast start time, the calculation unit 232 may calculate a difference value as an absolute value of a difference between the broadcast start time of the determined program, and the current time. If the calculated difference value is lower than a predetermined base value, the generator 233 may determine that the program titled "XXX" is associated with the popular keyword "XXX". That is, the generator 233 may determine the program "XXX" to be a reason for the popular keyword "XXX" being the popular keyword in real time.

The generator 233 may generate a representative phrase with respect to the popular keyword based on the program determined to be the reason for the popular keyword. As an example, the generator 233 may generate "on air from 10.00 p.m." to be the representative phrase, based on the broadcast start time of the program "XXX."

In another example, if "QQQ" is a popular keyword, the determination unit 231 may determine that the program titled "XXX" is associated with "QQQ" based on the Character Name information from the broadcast information of Table 1.

If the current time occurs after a broadcast end time, the calculation unit 232 may calculate the difference value as an absolute value of a difference between the broadcast end time of the determined broadcast program, and the current time. When the calculated difference value is lower than the predetermined base value, the generator 233 may determine that the program titled "XXX" is associated with the popular keyword "QQQ".

The generator 233 may generate a representative phrase associated with the determined program based on the popular keyword. For example, the generator 233 may generate "on air from 10.00 p.m. to 11.20 p.m." to be the representative phrase, based on the airtime of the program titled "XXX."

If the current time occurs between the broadcast start time and the broadcast end time, the calculation unit 232 may calculate the difference value as an absolute value of a difference between any one of the broadcast start time and the broadcast end time of the determined program, and the current time. The generator 233 may generate the representative phrase using the airtime of the determined program, based on the difference value.

A process of generating a representative phrase associated with a popular keyword when the popular keyword is a phrase with multiple words is described with reference to FIG. 3.

If the popular keyword is a phrase with multiple words, the determination unit 231 may segment the popular keyword into a plurality of words by analyzing morphemes of the popular keyword. Then, the determination unit 231 may determine programs including the segmented words from the broadcast information, by matching the segmented words to the broadcast information. In this instance, the determination unit 231 may continuously segment the segmented words until programs including the segmented words are found within the broadcast information.

For example, if the popular keyword is "XXX PPP QQQ" where multiple words may be combined, the determination unit 231 may segment the popular keyword into discrete and separate words, such as "XXX," "PPP," and "QQQ" by analyzing the morphemes of the popular keyword. Also, the determination unit 231 may determine program that include the segmented words, through the matching process conducted with the broadcast information.

As an example, the determination unit 231 may determine "XXX" and "ZZZ" to be the program titles including the segmented word "PPP," from the broadcast information. Since the program titles include the segmented word according to the broadcast information of Table 1, the determination unit 231 may terminate the continuous segmentation of the segmented word "PPP." Conversely, if programs including the segmented word are unable to be found from the broadcast information, the determination unit 231 may continuously segment the segmented word "PPP" until a determined program title is ascertained.

If multiple programs include the segmented words, the determination unit 231 may select a program title that includes or is associated with the greatest number of the segmented words.

For example, if "XXX" and "ZZZ" are determined to be the program titles that include the segmented word "PPP" from the broadcast information (as shown in Table 1), the determination unit 231 may then count a number of segmented words included in the programs "XXX" and "ZZZ." The determination unit 231 may count three segmented words "XXX," "PPP," and "QQQ" included in the program "XXX," and the single segmented word "PPP" included in the program "ZZZ." Accordingly, the determination unit 231 may select the program title "XXX", because "XXX" has the greatest number of segmented words associated with its broadcast information.

As another example, if a plurality of programs include the segmented words and the plurality of the programs have the same number of the segmented words, the determination unit 231 may select any one program from the plurality of programs, based on another attribute, such as the airtime of the plurality of the determined programs. In one example, the determination unit 231 may compare broadcast start times of the plurality of the programs and the current time, and broadcast end times of the plurality of the programs and the current time, and may select a program corresponding to the airtime closest to the current time.

Similarly, if the popular keyword is a single word, and there are multiple programs that are associated with the popular keyword, the determination unit 231 may also select a program with an airtime closest to the current time.

Then, the calculation unit 232 may calculate a difference value as an absolute value of a difference between the airtime of the selected program and the current time. The generator 233 may generate a representative phrase using the airtime of the determined program based on the difference value. Here, the airtime may include a broadcast start time and a broadcast end time. A process of calculating the difference value when the popular keyword includes a single word may be similar to the process of calculating the difference value in the aforementioned calculation unit 232, and accordingly duplicated description will be omitted here for conciseness.

If there are multiple programs associated with the popular keyword, the determination unit 231 may select any one of the plurality of the programs, based on a matching score of the plurality of the programs. Here, the popular keyword may be a single word or multiple words.

The calculation unit 232 may apply the matching score to the programs, based on various weighted factors, such as correlation to the popular keyword with various items/categories of the broadcast information, and may calculate a final matching score based on the matching score and a weight. The numbers provided below are merely examples. Thus, other numbers may be used and substituted for the various scoring and weighting.

First, the calculation unit 232 may apply the matching score for each program including the popular keyword based on whether the popular keyword may be included in a program title, the cast, a character name, and contents, among the items constituting the broadcast information. For example, the calculation unit 232 may apply 100 as the matching score, if the popular keyword is included in the program title, 80 when the popular keyword is included in the cast, 80 if the popular keyword is included in the character name, and 50 if the popular keyword is included in the contents, among the items constituting the broadcast information.

The calculation unit 232 may apply a time score for each program based on a time of the popular keyword being displayed or generated versus the airtime of a program. For example, if the difference in time in which the popular keyword is displayed or generated and the airtime of a program is within a predetermined margin of error, the calculation unit 232 may apply a time score of 50. The calculation unit 232 may adjust and subsequently apply the adjusted time score by deducting 5 from 50, for every 10-minutes that an airtime of a program falls outside the predetermined margin error.

Also, the calculation unit 232 may apply a broadcasting station weight for each program based on a source broadcast station of the program associated with the popular keyword. The calculation unit 232 may apply a higher weight for public broadcasters than cable broadcasters and radio broadcasters. For example, the calculation unit 232 may apply a weight of 1 to the public broadcasters, a weight of 0.1 to the cable broadcasters, and a weight of 0.05 to the radio broadcasters.

Finally, the calculation unit 232 may calculate a final matching score for each program, based on the matching score, the time score, and the broadcasting station weight which may be applied for each program including the popular keyword, and a viewing rate of the program. For example, the calculation unit 232 may calculate the final matching score for each program associate with the popular keyword using Equation 1.

$$\text{Final matching score} = (P+T) \times S \times A \qquad \text{[Equation 1]}$$

In Equation 1, P may denote a matching score applied based on the program name, the cast, the character name, and the contents, T may denote a time score, S may denote a broadcasting station weight, and A may denote a viewing rate.

According to Equation 1, the calculation unit 232 may calculate the final matching score for each program by multiplying a sum of the matching score and the time score, with the broadcasting station weight, and then multiplying that value with the viewing rate (A). For example, if the viewing rates of the programs (both associated with a popular keyword) "XXX" and "ZZZ" respectively are 30% and 10%, the calculation unit 232 may calculate the final matching score of "XXX" by multiplying (P+T)×S and 0.3, and may calculate the final matching score of "ZZZ" by multiplying (P+T)×S and 0.1.

Then, the determination unit 231 may select a program having the highest calculated final matching score, from the programs associated with the popular keyword.

Figure 4:
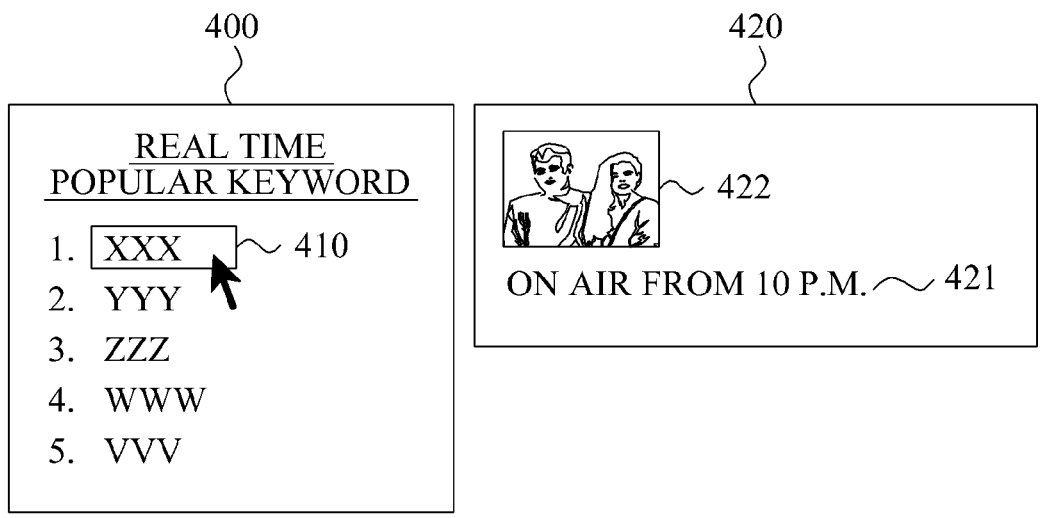
FIG. 4 is a diagram illustrating a screen where a generated representative phrase and a popular keyword may be displayed on a content providing page according to an exemplary embodiment of the present invention.

FIG. 4 is a diagram illustrating a screen where a generated representative phrase and a popular keyword may be displayed on a content providing page according to an exemplary embodiment of the present invention.

The generator 233 may generate a representative phrase with respect to the popular keyword based on the airtime of the selected program. For example, the generator 233 may generate "on air from 10.00 p.m." to be the representative phrase 421, based on the airtime of the selected program "XXX," as illustrated in FIG. 4.

The representative phrase provider 240 may provide the representative phrase by combining the generated representative phrase 421 with respect to the selected popular keyword popular keyword 410. For example, the representative phrase provider 240 may display on a content providing page 420, the representative phrase 421 in conjunction with a picture 422, such as a still image, and the like that represents the popular keyword. The representative phrase provider 240 may display on a content providing page, a representative phrase and a picture that represents the popular keyword. The popular keyword 410 may be selected by a mouse, a pointer, and the like, from a list 400 of popular keywords, that may be generated in real time.

Figure 5:
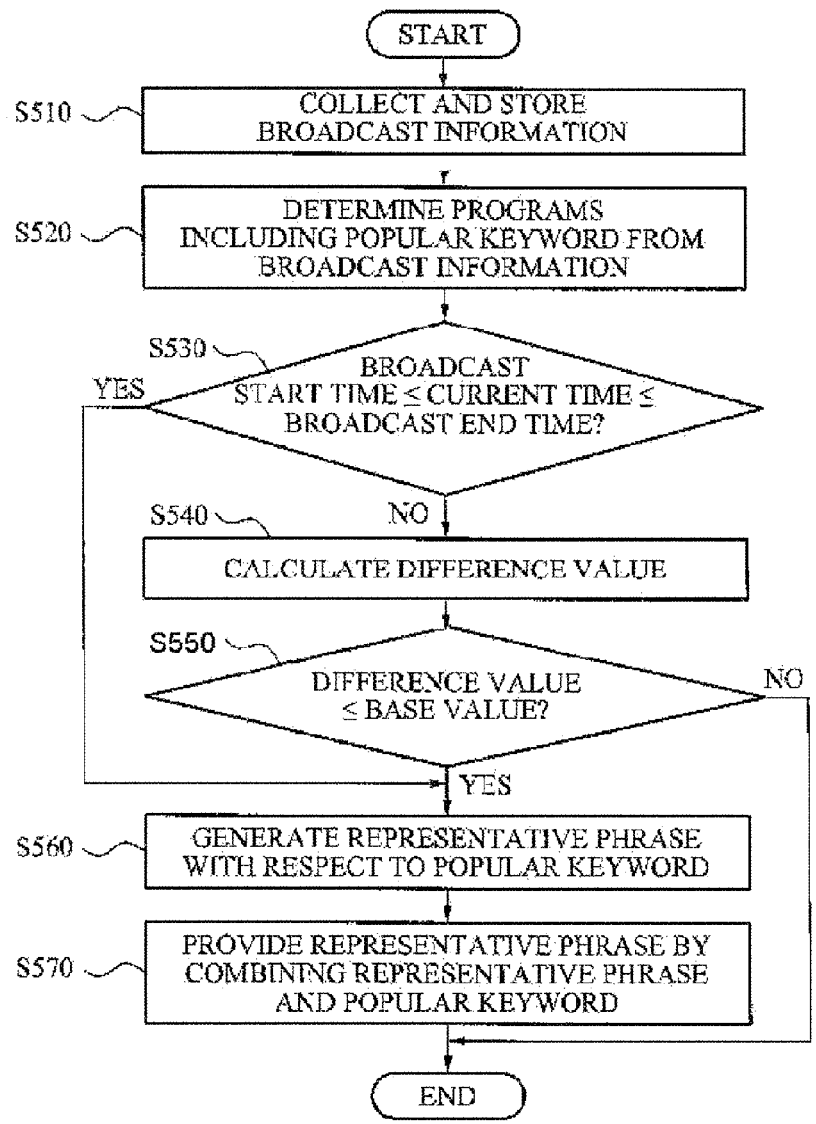
FIG. 5 is a flowchart provided to describe a process of providing a representative phrase with respect to a popular keyword using airtime according to an exemplary embodiment of the present invention.

FIG. 5 is a flowchart provided to describe a process of providing a representative phrase with respect to a popular keyword using airtime according to an embodiment of the present invention.

According to FIG. 5, the broadcast information collector 210 may periodically obtain broadcast information from a broadcasting station, and store the obtained broadcast information in the database 220, in operation S510. Here, the broadcasting station may include public TV broadcasters, cable TV broadcasters, radio broadcasters, Internet broadcasters, satellite TV broadcasters, and the like.

The determination unit 231 may determine a program associated with a popular keyword from the broadcast information in operation S520. For example, the determination unit 231 may determine a program "XXX" is associated with a popular keyword "QQQ", the popular keyword being sourced from a content providing page, such as a web page, and the program being obtained from the broadcast information, such as broadcast information represented in Table 1.

If the popular keyword, displayed or obtained at a current time, is out of a range between a broadcast start time and a broadcast end time of the determined program in operation S530, the calculation unit 232 may calculate a difference value as an absolute value of a difference between the airtime of the determined program and the current time in operation S540.

For example, when the current time occurs before the broadcast start time, or after the broadcast end time, the calculation unit 232 may calculate the difference value between the broadcast start time of the determined program and the current time, or the difference value between the broadcast end time of the determined broadcast program and the current time.

The calculation unit 232 may perform a comparison with respect to whether the calculated difference value is lower than a predetermined base value, in operation S550. For example, the base value may be predetermined to be two hours because there may be a higher probability that a keyword associated with the program may be searched two hours before the broadcast start time and two hours after the broadcast end time.

If the calculated difference value is lower than the base value in operation S550, the generator 233 may generate a representative phrase with respect to the popular keyword based on the airtime of the determined program in operation S560.

As an example, if the current time occurs before the broadcast start time of the determined program "XXX," the generator 233 may generate "on air from 10.00 p.m." to be the representative phrase with respect to the popular keyword, using the broadcast start time of the determined broadcast program "XXX."

As another example, if the current time occurs after the broadcast end time of the determined program "XXX," the generator 233 may generate "on air from 10.00 p.m. to 11.20 p.m." to be the representative phrase, using the broadcast start time and the broadcast end time of the determined broadcast program "XXX."

Then, the representative phrase provider 240 may provide the representative phrase by combining the generated representative phrase, and the popular keyword, in operation S570. For example, the representative phrase provider 240 may display the representative phrase on a content providing page, such as a web page, by combining the popular keyword "QQQ" and the generated representative phrase "on air from 10.00 p.m." In this instance, the representative phrase provider 240 may display the representative phrase on the web page by combining a picture that represents the program "XXX" associated with the popular keyword "QQQ," with the popular keyword and the representative phrase.

If a plurality of programs is determined, the determination unit 231 may select any one program based on airtime of the determined programs, in operation S560. For example, the determination unit 231 may select a program having airtime closest to the current time, by comparing broadcast start times of the determined programs and the current time, and by comparing broadcast end times of the determined programs and the current time. Then, the generator 233 may generate a representative phrase with respect to the popular keyword using the airtime of the selected program.

Figure 6:
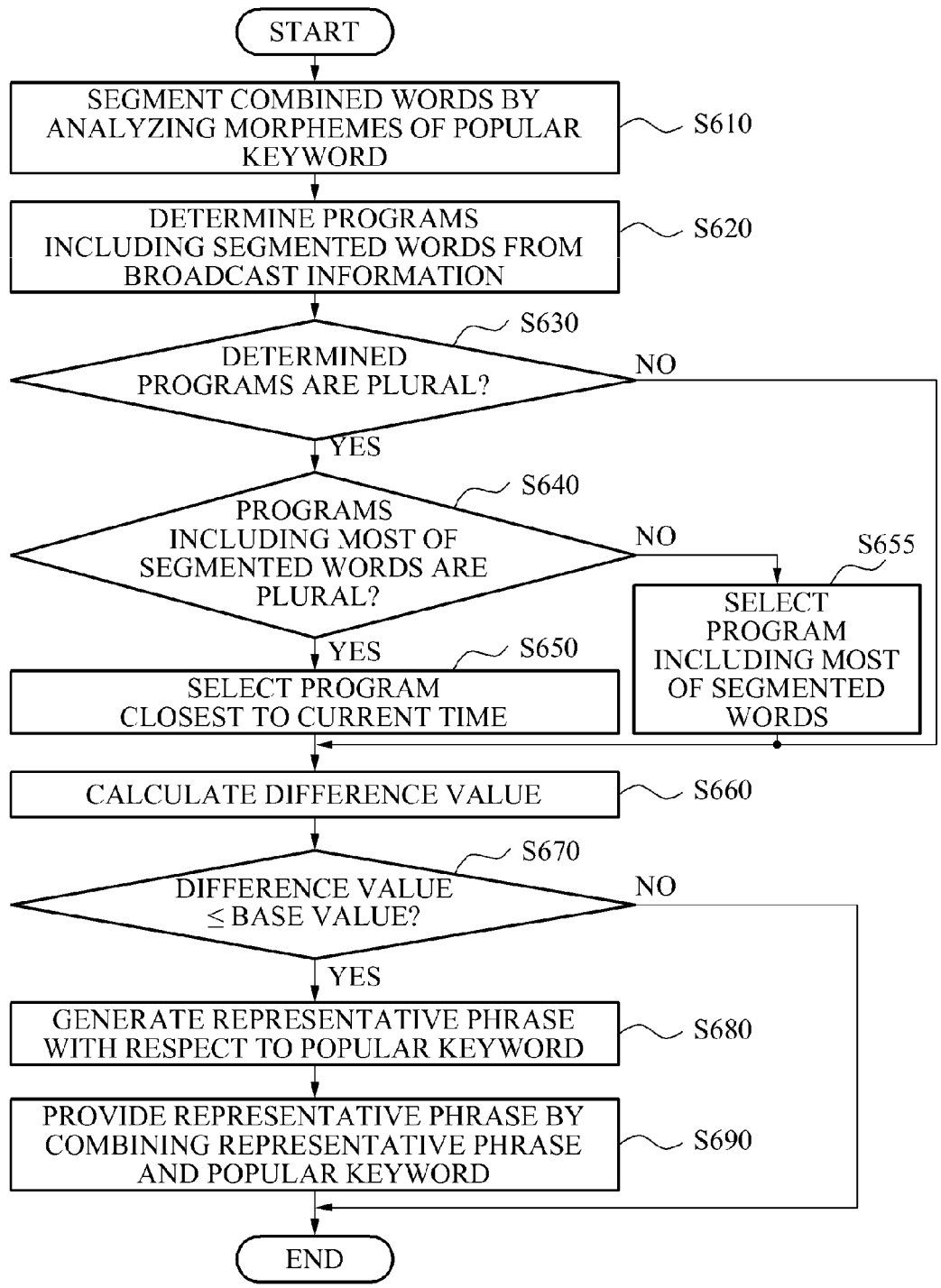
FIG. 6 is a flowchart provided to describe a process of generating a representative phrase with respect to a popular keyword with multiple words, according to an exemplary embodiment of the present invention.

FIG. 6 is a flowchart provided to describe a process of generating a representative phrase with respect to a popular keyword with multiple words, according to an exemplary embodiment of the present invention.

Referring to FIG. 6, the determination unit 231 may analyze morphemes of a popular keyword with multiple words, and may segment the multiple words, in operation S610. For example, if the popular keyword is "XXX PPP QQQ", the determination unit 231 may segment the popular keyword into "XXX," "PPP," and "QQQ" by analyzing the morphemes of the popular keyword.

Also, the determination unit 231 may determine programs including the segmented words from the broadcast information in operation S620. For example, the determination unit 231 may determine "XXX" and "ZZZ" to be the programs associated with a segmented word "PPP," from the broadcast information. The determination unit 231 may count a number of segmented words included in the programs "XXX" and "ZZZ." The determination unit 231 may count three segmented words "XXX," "PPP," and "QQQ" included in the program "XXX," and a single segmented word "PPP" included in the program "ZZZ." Accordingly, the determination unit 231 may select the program "XXX", due to a higher count of segmented words.

If multiple programs are determined to be associated with the popular keyword, in operation S630, and the multiple programs each are associated with an equal number of segmented words in operation S640, the determination unit 231 may select a program with an airtime closest to the current time, from the determined programs, in operation S650. The determination unit 231 may select the program with an airtime closest to the current time, by comparing both broadcast start times and broadcast end times of the plurality of the determined programs, with the current time.

If a single program is associated with the highest number of segmented words, in operation S640, the determination unit 231 may select the program associated with the highest number of segmented words, in operation S655. For example, the "XXX" may be associated with three segmented words, and the "ZZZ" may be associated with a single segmented word, and accordingly the determination unit 231 may select the program "XXX."

Then, the calculation unit 232 may calculate a difference value between the airtime of the selected program, and the current time in operation S660. If the difference value is lower than a predetermined base value in operation S670, the generator 233 may generate a representative phrase with respect to the popular keyword using the airtime of the selected program in operation S680. Then, the representative phrase provider 240 may provide the representative phrase by combining the generated representative phrase and the popular keyword in operation S690. Here, operations S660 through S690 are duplicated with the aforementioned operations S540 through S570, and accordingly further descriptions will be omitted here for conciseness.

Figure 7:
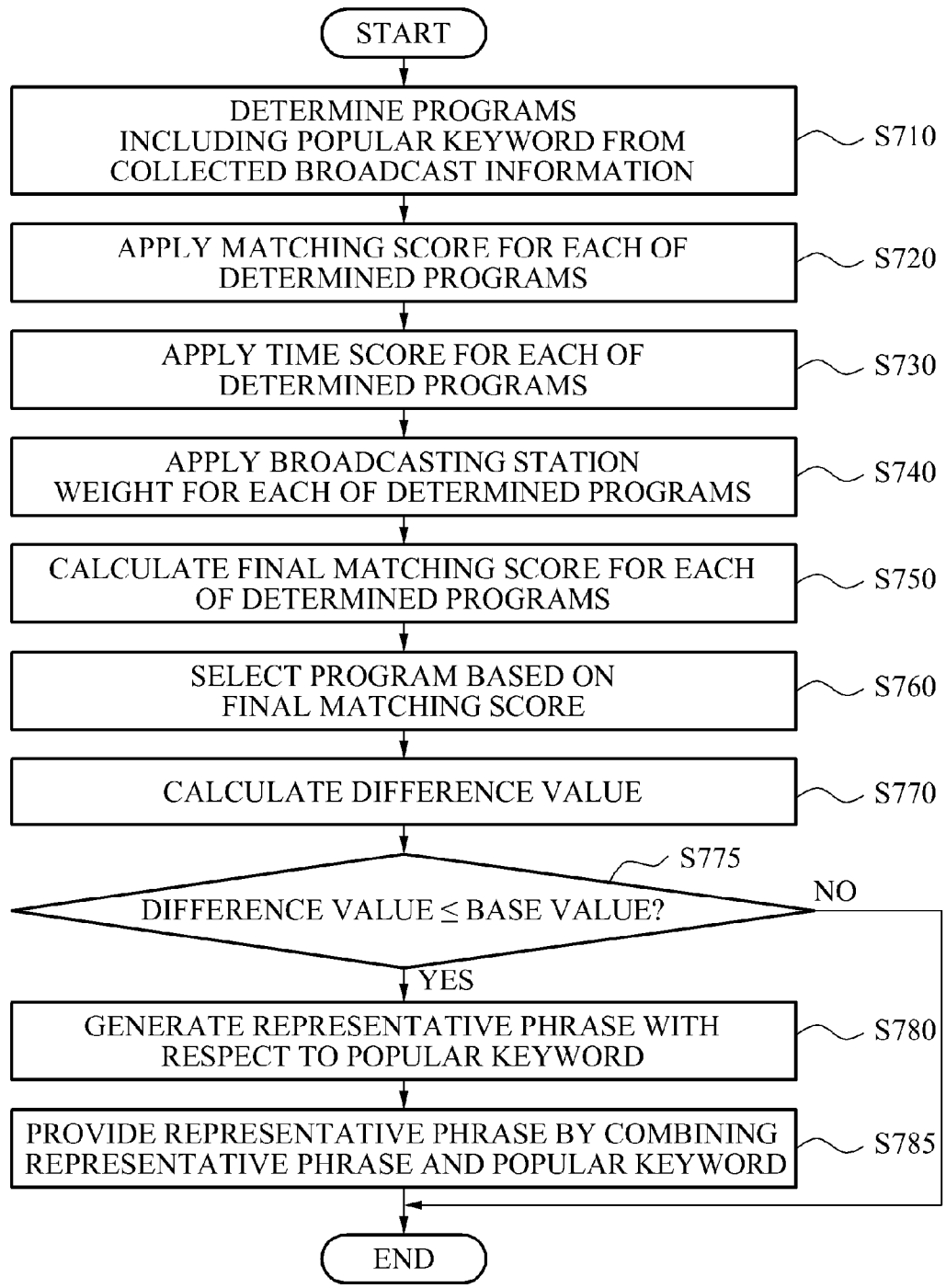
FIG. 7 is a flowchart provided to describe a process of generating a representative phrase using a matching score according to an exemplary embodiment of the present invention.

FIG. 7 is a flowchart provided to describe a process of generating a representative phrase using a matching score according to an exemplary embodiment of the present invention.

Referring to FIG. 7, the determination unit 231 may determine programs associated with a popular keyword from obtained broadcast information, in operation S710.

The calculation unit 232 may apply a matching score for each of the determined programs, in operation S720. The calculation unit 232 may apply the matching score for each program associated with the popular keyword, based on whether the popular keyword corresponds or is related to a program title, the cast, a character name, and contents, among items constituting the broadcast information, in operation S730.

For example, the calculation unit 232 may apply different scores if the popular keyword correspond or is related to various categories of the broadcast information. For example the matching score may be, 100 for the program title, 80 for the cast, 80 for the character name, and 50 for the contents, among the items constituting the broadcast information.

The calculation unit 232 may apply a time score for each of the determined programs, in operation S740.

For example, if the time associated the popular keyword is significantly related to the airtime of the determined, the calculation unit 232 may apply a time score of 50 to the corresponding programs. If the time associated with the popular keyword is less related to the airtime (but still within a predetermined range) with the exact airtime, the calculation unit 232 may still apply the time score of 50.

If the time associated with the popular keyword is outside a predetermine range of a difference with an airtime of the program, the calculation unit 232 may apply the time score by deducting 5 from 50 for every 10-minute away from the predetermined range. For example, if there is a thirty-minute difference between predetermined threshold between the broadcast start time of the program and the time associated with the popular keyword, the calculation unit 232 may apply the time score of 35.

The calculation unit 232 may apply a broadcasting station score for each program, in operation S750. For example, the calculation unit 232 may apply different weights based on whether the determined programs correspond to public broadcasters, cable broadcasters, or radio broadcasters, and the like.

The calculation unit 232 may calculate a final matching score for each program in operation S760. The calculation unit 232 may calculate the final matching score for each program, based on a viewing rate for each of the determined programs, as expressed by Equation 1.

For example, the calculation unit 232 may calculate the final matching score for each of the determined programs by calculating a sum of the applied matching score and the time score, and then by multiplying the calculated sum by the broadcasting station weight and by the viewing rate.

Then, the determination unit 231 may select any one program among the determined programs, based on the calculated final matching score, in operation 5770. For example, the determination unit 231 may select a program which may have the highest calculated final matching score.

The calculation unit 232 may calculate a difference value between the airtime of the selected program, and the current time in operation 5770. If the difference value is lower than a predetermined base value in operation 5780, the generator 233 may generate a representative phrase using the airtime of the selected program in operation 5785. Then, the representative phrase provider 240 may provide the representative phrase by combining the generated representative phrase and the popular keyword in operation 5790. Here, operations 5770 through 790 are duplicated with the aforementioned operations S540 through S570, and accordingly further descriptions will be omitted here.

The exemplary embodiments according to the present invention may be recorded in non-transitory computer-readable media including program instructions to implement various operations embodied by a computer. The media may also include, alone or in combination with the program instructions, data files, data structures, and the like. The media and program instructions may be those specially designed and constructed for the purposes of the present invention, or they may be of the kind well-known and available to those having skill in the computer software arts. Examples of computer-readable media include magnetic media such as hard disks, floppy disks, and magnetic tape; optical media such as CD ROM discs and DVD; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A method of providing a representative phrase using at least one processor, comprising:
    obtaining, using the at least one processor, broadcast information;
    obtaining, using the at least one processor, a popular keyword from a content page, the popular keyword being at least a keyword input entered into a search engine a desired number of times during a desired period of time;
    generating, using the at least one processor, a representative phrase based on a correlation between the broadcast information and the popular keyword, the generated representative phrase indicating information about at least one program that is associated with the broadcast information and the popular keyword, the generating including,
    calculating a time score for determining the association of the popular keyword to a program of the broadcast information, the calculating based on a display time of the popular keyword on the content page and a broadcast time of the program, the time score based on a desired margin of error and the broadcast time of the program,
    determining the program associated with the popular keyword, the determining based on at least the calculated time score, and
    generating the representative phrase by combining at least a portion of the broadcast information with a determined airtime of the determined program;
    generating, using the at least one processor, a display representative phrase by combining the generated representative phrase with the popular keyword; and
    providing, using the at least one processor, the display representative phrase in the content page for display in association with the determined program, the providing including displaying the display representative phrase on the content page.

2. The method of claim 1, wherein the generating further comprises:
    if multiple programs are determined, determining the program based on a broadcast start time and a broadcast end time being closest to a time of obtaining the popular keyword.

3. The method of claim 1, wherein the determining further comprises:
    if the popular keyword contains multiple words, segmenting the popular keyword into a plurality of words by analyzing morphemes of the popular keyword; and
    determining the program based on the segmented words.

4. The method of claim 3, wherein the determining further comprises:
    if multiple programs are determined, determining the program associated with the most number of segmented words.

5. The method of claim 1, wherein the determining further comprises:
    if multiple programs are determined, utilizing a weighting function to determine the program.

6. The method of claim 5, wherein utilizing the weighting function comprises:
    applying a matching score, a time score, and a broadcasting station weight to the determined programs, and
    calculating a final matching score with respect to the determined programs based on at least one of the applied matching score, the applied time score, the applied broadcasting station weight, and a viewing rate of the determined program.

7. The method of claim 6, wherein the determining further comprises: determining the program with the highest calculated final matching score.

8. The method of claim 1, wherein the obtaining of the popular keyword further comprises selecting from a list of popular keywords from a content providing page.

9. The method of claim 1, wherein the providing further comprises displaying the representative phase along with an icon associated with the popular keyword.

10. A non-transitory computer-readable medium comprising program code for providing a representative phrase, the program code, when executed by at least one processor, configures the at least one processor to:
    obtain broadcast information;
    obtain a popular keyword from a content page, the popular keyword being at least a keyword input entered into a search engine a desired number of times over a desired period of time;

generate a representative phrase based on a correlation between the broadcast information and the popular keyword, the generated representative phrase indicating information about at least one program that is associated with the broadcast information and the popular keyword;

calculate a time score for determining the association of the popular keyword to a program of the broadcast information, the calculating based on a display time of the popular keyword on the content page and a broadcast time of the program, the time score based on a desired margin of error and the broadcast time of the program, determine the program associated with the popular keyword, the determining based on at least the calculated time score;

generate the representative phrase by combining at least a portion of the broadcast information with a determined airtime of the determined program;

generate a display representative phrase by combining the generated representative phrase with the popular keyword; and provide the display representative phrase in the content page for display in association with the determined program, the providing including displaying the display representative phrase on the content page.

11. A non-transitory computer-readable storage media having computer readable instructions stored thereon which when executed by at least one processor, cause the at least one processor to:

generate a representative phrase based on a correlation between broadcast information and a popular keyword from a content page, the generated representative phrase indicating information about at least one program that is associated with the broadcast information and the popular keyword, the popular keyword being at least a keyword input entered into a search engine a desired number of times over a desired period of time;

calculate a time score for determining the association of the popular keyword to a program of the broadcast information, the calculating based on a display time of the popular keyword on the content page and a broadcast time of the program, the time score based on a desired margin of error and the broadcast time of the program;

determine the program associated with the popular keyword, the determining based on at least the calculated time score;

generate the representative phrase by combining at least a portion of the broadcast information with a determined airtime of the determined program;

generate a display representative phrase by combining the generated representative phrase with the popular keyword;

provide the display representative phrase in the content page for display in association with the determined program, the providing including displaying the display representative phrase on the content page; and determine the program of the broadcast information associated with the popular keyword.

12. The non-transitory computer-readable storage media of claim 11, wherein the computer readable instructions, when executed, causes the at least one processor to:
select the determined program based on a broadcast start time and a broadcast end time being closest to a time when the popular keyword is obtained, if multiple programs are determined.

13. The non-transitory computer-readable storage media of claim 11, wherein the computer readable instructions, when executed, causes the at least one processor to:
segments the popular keyword into a plurality of words by analyzing morphemes of the popular keyword, and determines the program based on the plurality of the segmented words, if the popular keyword includes multiple words.

14. The non-transitory computer-readable storage media of claim 13, wherein the computer readable instructions, when executed, causes the at least one processor to:
determines the program with the most number of segmented words, if multiple programs are determined.

15. The non-transitory computer-readable storage media of claim 11, wherein the computer readable instructions, when executed, causes the at least one processor to:
calculate a weight of determined programs, if multiple programs are determined.

16. The non-transitory computer-readable storage media of claim 15, wherein the computer readable instructions, when executed, causes the at least one processor to:
apply a matching score, a time score, and a broadcasting station weight to the determined programs;
calculate a final matching score with respect to the determined programs, based on at least one of the applied matching score, the applied time score, the applied broadcasting station weight, and a viewing rate of the determined programs.

17. The non-transitory computer-readable storage media of claim 16, wherein the computer readable instructions, when executed, causes the at least one processor to:
determines the program with the highest calculated final matching score.

18. The non-transitory computer-readable storage media of claim 11, the computer readable instructions, when executed, causes the at least one processor to:
display the provided representative phrase along with an icon associated with the popular keyword.

19. The method of claim 1, wherein the method further comprises:
obtaining an image associated with the popular keyword; and
generating the content page by combining the obtained image with the generated display representative phrase.

* * * * *